United States Patent [19]

Falbaum et al.

[11] Patent Number: 5,741,768
[45] Date of Patent: Apr. 21, 1998

[54] COMPOSITION AND IMPROVED PH DRIVEN METHOD FOR WASTEWATER SEPARATION USING AN AMPHOTERIC DICARBOXYLATE AND A CATIONIC DESTABILIZER COMPOSITION

[75] Inventors: David J. Falbaum, St. Paul; Robert D. Hei, Cottage Grove; Helmut K. Maier, Golden Valley; Paul J. Mattia, Prior Lake, all of Minn.

[73] Assignee: Ecolab Inc., St. Paul, Minn.

[21] Appl. No.: 647,697

[22] Filed: May 15, 1996

Related U.S. Application Data

[62] Division of Ser. No. 267,664, Jun. 29, 1994, Pat. No. 5,523,000.

[51] Int. Cl.$^6$ ............................ C11D 17/00; C11D 17/08
[52] U.S. Cl. .......................... 510/339; 510/341; 510/350; 510/356; 510/360; 510/361; 510/422; 510/423; 510/433; 510/434
[58] Field of Search ............................ 510/339, 341, 510/350, 356, 360, 361, 422, 423, 433, 434

[56] References Cited

U.S. PATENT DOCUMENTS

| | | | |
|---|---|---|---|
| 2,328,901 | 9/1943 | Grimm et al. | 260/72 |
| 3,048,548 | 8/1962 | Martin et al. | 252/135 |
| 3,117,999 | 1/1964 | Boettner et al. | 260/584 |
| 3,118,000 | 1/1964 | Dupre et al. | 260/584 |
| 3,259,570 | 7/1966 | Priesing et al. | 210/53 |
| 3,334,147 | 8/1967 | Brunelle et al. | 260/611 |
| 3,444,242 | 5/1969 | Rue et al. | 260/611 |
| 4,152,307 | 5/1979 | Shibahara et al. | 260/29.6 |
| 4,605,773 | 8/1986 | Maloney et al. | 564/505 |
| 4,657,784 | 4/1987 | Olson | 427/213 |
| 4,681,914 | 7/1987 | Olson et al. | 252/91 |
| 4,773,939 | 9/1988 | Meffert et al. | 134/10 |
| 4,820,450 | 4/1989 | Wile et al. | 252/545 |
| 5,073,292 | 12/1991 | Deguchi et al. | 252/174.17 |
| 5,110,503 | 5/1992 | Cohen | 252/325 |
| 5,112,603 | 5/1992 | Nadolsky et al. | 514/772.3 |
| 5,207,922 | 5/1993 | McFarlan et al. | 210/708 |
| 5,340,469 | 8/1994 | Montgomery | 210/96.1 |
| 5,368,779 | 11/1994 | Snethen | 252/545 |
| 5,385,674 | 1/1995 | Kupfer et al. | 210/708 |
| 5,500,151 | 3/1996 | Cao et al. | 252/546 |

FOREIGN PATENT DOCUMENTS 862719  3/1961  United Kingdom.

OTHER PUBLICATIONS

Encyclopedia of Chemical Technology, (Second Edition), vol. 3, pp. 550–567.
Encyclopedia of Chemical Technology, (Second Edition), vol. 6, pp. 1–24.
Encyclopedia of Chemical Technology, (Second Edition), vol. 18, pp. 688–689.
Encyclopedia of Chemical Technology, (Second Edition), vol. 19, pp. 507–592.
Patent Abstracts of Japan, vol. 017, No. 339 (C–1075), 28 Jun. 1993 & JP,A,05 039498 (Taiho Ind Co Ltd) 19 Feb. 1993.

*Primary Examiner*—Mukund J. Shah
*Assistant Examiner*—Deepak R. Rao
*Attorney, Agent, or Firm*—Merchant, Gould, Smith, Edell, Welter & Schmidt, P.A.

[57] ABSTRACT

Improved separation of emulsified hydrophobic organic soils can be obtained from aqueous effluents using an amphoteric dicarboxylate surfactant material in combination with cationic destabilizer or floeculent materials. Such a treatment in combination with an acidic pH adjustment causes the rapid separation of hydrophobic organic soils from the aqueous stream, the treated aqueous stream is environmentally compatible.

Improved laundry detergents comprising an organic amphoteric carboxylate surfactant and selected nonionic surfactants provide both cleaning for fiber and fabric containing items soiled with substantial quantities of hydrophobic soil. The pH of an effluent generated in such cleaning processes can be adjusted to an acid pH and treated with a cationic material causing a break that permits rapid and substantially complete separation of the hydrophobic organic soils from the effluent. Residual concentrations of organic soil in effluent water can be less than 250 ppm and can be as low as 10 ppm.

31 Claims, No Drawings

5,741,768

COMPOSITION AND IMPROVED PH DRIVEN METHOD FOR WASTEWATER SEPARATION USING AN AMPHOTERIC DICARBOXYLATE AND A CATIONIC DESTABILIZER COMPOSITION

This is a divisional of application Ser. No. 08/267,664, filed Jun. 29, 1994, now U.S. Pat. No. 5,523,000, which application(s) are incorporated herein by reference.

FIELD OF THE INVENTION

The invention relates to separating an emulsified hydrophobic organic soil from an aqueous effluent stream using a combination of an amphoteric dicarboxylate and a cationic coagulant, flocculent or destabilizer material, at an acid pH. The amphoteric and the flocculent can be added separately added and can be added at any point. Preferably the amphoteric is added in a detergent and the flocculent is added after the organic soil is emulsified in the aqueous stream. Such contaminated aqueous effluent commonly arises in a number of institutional and industrial installations. These contaminated aqueous waste streams cannot be directly discarded in municipal waste treatment systems. Such waste streams can be treated with materials that can cause the hydrophobic organic soil to separate from the aqueous streams in a number of chemical addition protocols. The invention also relates to an improved cleaning composition for a fiber containing non-woven or woven fabric item contaminated with substantial quantities of organic hydrophobic soils such as fats, oils and greases and to methods for separating such soils from the cleaning process effluent. The cleaning method comprises an active chemical addition and contains a pH change step prior to disposal of the effluent, that causes the rapid separation of hydrophobic organic soils from effluent or wastewater. The cleaning composition can contain both organic and inorganic materials that cooperate to obtain cleaning and rapid hydrophobic soil separation from effluent.

BACKGROUND OF THE INVENTION

A number of institutional and industrial operations produce aqueous effluent contaminated with substantial proportions of hydrophobic organic soils. Such soils are commonly found in the waste stream as emulsified droplets dispersed in the waste stream. Such emulsions are commonly stabilized by the presence of one or more surfactants that are part of the effluent material. Commonly, nonionic surfactants act as stabilizing agents. Such waste streams are most commonly a result of the disposal of hydrophobic waste or a result of a cleaning operation wherein large quantities of hydrophobic soils are cleaned from environmental surfaces, clothing, rags, dishes and pans, etc. and other hydrophobic soil containing objects. The resulting aqueous effluent can contain substantial proportions of hydrophobic organic soils typically derived from fat, oil and grease. Prior to disposal, the aqueous effluent must be treated to separate such soils before the effluent can be safely discharged into municipal sewer systems.

The use of alkaline cleaning compositions containing inorganic detergent and builder components in combination with organic surfactant compositions and other components have been common for many years in laundry operations. Typical laundry processes involve contacting soiled woven or non-woven fabric with an aqueous cleaning composition containing proportions of laundry chemicals dissolved or suspended in the aqueous medium. The organic and inorganic chemicals cooperate to remove soil from fabric. The soils become suspended by the cleaning chemicals in the aqueous through the action of the active chemical cleaners.

In commercial laundry operations soil load and soil type can create substantial operating difficulties. A substantial proportion of the laundry workload will constitute items contaminated with such hydrophobic organic soil. Such items include mechanics' clothing, shop wipes, shop towels, contaminated uniforms, drop cloths, machine covers, mop heads, and other units typically manufactured from either synthetic or natural fibers woven or otherwise assembled into typically flexible units that can be soaked or saturated with substantial quantities of the hydrophobic organic soils. The hydrophobic organic soils typically involved in the cleaning methods and compositions of this invention comprise fats, oils and grease. Fats are typically organic materials derived from natural sources such as animals and plants. Fats are typically liquid or solid fatty acid glycerol esters, phospholipids, etc. and are typically produced in food processing but also have a number of industrial uses. Oils are commonly liquids produced from petroleum refining but can also include materials such as liquid vegetable oil, silicone oil, etc. Greases are commonly considered to be a heavy, thick solid or semisolid hydrocarbon or suspensions of organic or inorganic solid particulate materials in a fat or oil base. Greases are typically substantially semisolid or solid materials used in lubrication purposes. Commonly such hydrophobic organic soils are generated in kitchen, bar or other food service environments, in shop environments such as printing shops, metal working shops, auto repair shops, fast food outlets, restaurants, etc. In the operations of such installations, substantial quantities of fats, oils and greases are used in operation and can come in contact with walls and floors of the installation and the clothing worn by employees. The environment of the installations are commonly cleaned using mops, shop towels, bar towels, bar mops, kitchen rags, wipes, rags and other cleaning instruments. The soil load can be as much as 20 wt-%, typically 5 wt-% to 17 wt-%, on the fabric.

Municipal, county, state and federal regulations often place stringent requirements on the concentration of a variety of contaminants in effluent. After laundering soiled items, the substantial quantity of organic soils in laundry effluent is often unacceptable environmentally due to the presence of up to 2000 ppm hydrophobic soil and often more. In the production of effluent from commercial laundries, fats, oils and greases are often required to be substantially less than 250 ppm and often between 10 and 100 ppm as measured by EPA analytical method 180.1.

Efficient laundry chemicals in aqueous media remove hydrophobic soils by creating a emulsion of the soil in the aqueous medium. The emulsion comprises small hydrophobic droplets sometimes called micelles which are surrounded and stabilized by the detergent or surfactant materials. The dispersed nature of the soil in aqueous medium is a substantial barrier to its removal after laundering. Before removal can be obtained, the micelle must be destabilized, the emulsion must be broken, the fats, oils and greases must be reassembled into a single phase and the single phase hydrophobic material must be separated from the aqueous solution. A number of methods for separating fats, oils and greases from laundry effluent have been attempted. One useful alternative involves changing the pH of the wash medium from neutral or mildly alkaline to acid to break the emulsion of the organic hydrophobic soil. Once the emulsion is broken, a separate phase of hydrophobic soil forms which can be readily removed.

Boettner et al., U.S. Pat. No. 3,117,999, teach a tertiary carbonimine substituted with both ethylene oxide and propylene oxide blocks to form nonionic surfactant materials. Dupre et al., U.S. Pat. No. 3,118,000, teach alkylamine compositions substituted with both ethylene oxide and propylene oxide blocks to produce nonionic surfactant material. Maloney et al., U.S. Pat. No. 4,605,773, teach a low foaming pH sensitive alkyl amine polyether surfactant that can be used in production of paper from recycled secondary fiber. The disclosed surfactants are pH sensitive and have substantial surfactant properties. Cohen, U.S. Pat. No. 5,110,503, teaches compositions and methods for cleaning hydrophobic organic soil containing contaminated fabric with methods of separating the hydrophobic soil from laundry effluent. Cohen uses a composition of matter comprising a first component, comprising a reaction product of an $\alpha,\beta$-unsaturated acid and a short chain amine such as a $\beta$-amino dipropionic acid, having an assigned structure as $RN(CH_2CH_2CO_2H)_2$, with a variety of ether surfactants such as an ethoxylate-propoxylate block copolymer, sulfates or sulfonates, alkoxylated phosphates. Lastly, McFarlan et al., U.S. Pat. No. 5,207,922, is primarily directed to a method of treating laundry effluent or wastewater for the purpose of separating fats, oils and greases. At Column 3, lines 19–60, McFarlan et al. teach typical laundry chemical compositions.

The comparative ability for separating hydrophobic organic soils such as fats, oils and greases from laundry effluent is typically characterized by the concentration of the chemicals used in the laundry, the pH at which the phase separation occurs, the rate of the phase separation and the final concentration in the aqueous effluent of hydrophobic soil such as residual fats, oils and greases. The degree of separation is pH sensitive. Reducing the pH as low as 2 can cause a clean break, however, such a low pH requires substantial amounts of acid and also exposes operating equipment and personnel to unacceptably low pH. Further, even at such low pH's some compositions fail to reach an acceptable level of fats, oils and greases in effluent. We have found in our work with pH sensitive laundry chemical systems that many such prior art systems have an unacceptably low pH requirement to obtain a clean separation or fail to reduce the concentration of fats, oils and greases in the aqueous effluent to a level sufficient to satisfy environmental regulations.

A substantial need continues to exist for a method of reducing the residual concentration of hydrophobic soils in aqueous waste streams using a pH change in a chemical addition protocol. Further, a need exists to improve laundry chemical systems that can be used in cleaning processes involving items having a substantial loading of hydrophobic organic soil in laundry effluent. Systems are needed that produce an effluent that can be treated after laundering to separate fats, oils and greases such that the final concentration in the aqueous effluent is less than 250 ppm and preferably substantially below 100 ppm.

BRIEF DISCUSSION OF THE INVENTION

We have found that emulsified hydrophobic organic soil in an aqueous effluent stream can be separated using the combined action of a cationic destabilizer material and an amphoteric surfactant as set forth below. In a preferred mode, a laundry effluent or other effluent of a cleaning process containing an amphoteric dicarboxylate from the laundry detergent can be treated with a flocculent or destabilizer, at low pH, to cause the soil to separate from the aqueous stream. These materials in combination with a pH change cause a rapid demulsification, and a rapid separation of the hydrophobic soils from the aqueous stream. Within a short period of time the emulsion breaks, and a phase separation occurs when the hydrophobic soils separate from the aqueous medium leaving a low residual concentration of soil. The cationic materials and the amphoteric dicarboxylate surfactant can be added in a number of different modes at various stages of wastewater generation and transfer to discharge outlets including a single addition, portion-wise addition and continuous addition.

We have also found an alkaline cleaning composition useful in the processes of the invention comprising an effective detergent amount of a source of alkalinity, an effective amount of an amphoteric carboxylate surfactant of the formula:

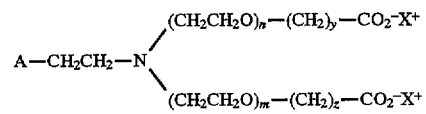

or preferably an amphoteric carboxylic surfactant of the formula:

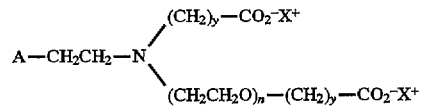

wherein A is R, or

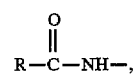

R is $C_{6-17}$ alkyl, y and z are independently selected from the group consisting of 1–6 and m and n are independently selected from the group consisting of 0–6 and m+n≧1; and a nonionic surfactant composition comprising either a $C_{8-18}$ alcohol ethoxylate having 3 to 15 moles of ethylene oxide or a $C_{8-9}$ alkyl phenol ethoxylate having 4 to 15 moles of ethylene oxide per mole of surfactant. The detergent can be used with a flocculent or destabilizer to initiate a separation of organic hydrophobic soils from laundry effluents by a pH adjustment. The effective pH range is between 2 and 7, and is preferably between 3 and 6.5. Further, once the effective pH is reached and the separation occurs, the concentration of hydrophobic organic soils in the effluent can be as little as 100 ppm or lower. In our experimental work with the systems of this invention, we have found that the materials achieve a separation in a maximum concentration of hydrophobic organic soils in the effluent that is substantially and surprisingly better than the performance of prior art laundry chemicals when comparable amounts of chemicals are used.

DETAILED DESCRIPTION OF THE INVENTION

Emulsified hydrophobic soils can be effectively separated from aqueous streams using a combination of a flocculent or cationic destabilizer material and an amphoteric dicarboxylate surfactant. In a preferred laundry process, the amphoteric dicarboxylate is added in the laundry detergent. Adjusting the pH of the effluent followed by an addition of the cationic flocculent causes a rapid demulsification of the aqueous stream, a rapid phase separation of the hydrophobic organic soil from the aqueous material which can then be readily separated. The amphoteric surfactant can be added at any stage in the production of the contaminated stream (e.g.) in a laundry chemical system, metered into a downstream pipe or conduit, or post added with the cationic destabilizer. The cationic destabilizer is typically added after the pH adjustment. The resulting treated aqueous stream containing minimal residual amounts of hydrophobic soil can then be discarded into a municipal waste treatment system.

The separation methods of the invention use a cationic destabilizer with a amphoteric dicarboxylate in a pH change protocol to separate soil. The laundry compositions of the invention include an effective concentration for detergent purposes of a source of alkalinity, a nonionic surfactant, and an amphoteric dicarboxylate containing surfactant to clean contaminated objects and surfaces.

The Cationic Flocculent or Destabilizer

In the compositions and methods of the invention, a flocculent or cationic destabilizer is added after a pH adjustment to acidic conditions. The flocculent causes the small emulsified particles to form large removable droplets or a separate phase of hydrophobic material. The cationic materials are a well known class of polymeric chemicals that are used in separating liquid and solid soil phases from aqueous streams. Such cationic materials are disclosed in *Polyelectrolytes for water and waste water treatment*, Schwoyer, W. L. K. (CRC Press, Boca Raton, Fla. 1981). Generally, the cationic materials are inorganic or organic and are oligomeric or polymeric.

Inorganic cationic materials include polyaluminum chloride aluminum sulfate or other alum materials such as ammonia alum or ammonium alum, potassium alums; calcium chloride, ferric chloride, ferric sulfate, ferrous sulfate, sodium aluminate, sodium silicate having an excess of sodium oxide over silicon dioxide, etc. Polyaluminum chloride is a polyaluminum oxide compound with a proportion of the oxide atoms substituted by chlorine atoms.

Organic cationic materials or cationic polyelectrolytes are typically prepared using common free radical addition polymerization, condensation reactions, an epoxide addition reaction and a variety of other reactions in existing polymer backbones including Hofmann degradation, Mannich reaction, and nucleophilic displacements. High molecular weight polymerized cationic materials are manufactured by polymerizing a cationic monomer. Cationic monomers include acrylic monomers such as tertiary nitrogen containing acrylates, tertiary nitrogen containing acrylamides, quaternary nitrogen containing acrylates and quaternary nitrogen containing acrylamides; heterocycloaromatic cyclic vinyl monomers such as vinylimidazolines, vinylpyridines, vinylbenzyl quaternary ammonium salts and allylamines.

Examples of the cationic acrylic monomer of the general formula are quaternary ammonium salts (using quaternizing agents such as methyl chloride, dimethyl sulfate, and benzyl chloride) of dialkylaminoalkyl (meth)acrylates [such as dimethylaminoethyl (meth)acrylate, diethylaminoethyl (meth)acrylate, 3-dimethylamino-2-hydroxypropyl (meth) acrylate] and dialkylaminoalkyl (meth)acrylamides [such as dimethylaminoethyl (meth)acrylamide and 3-dimethylamino-2-hydroxypropyl acrylamide].

The cationic vinyl imidazolines include N-vinyl imidazoline and tertiary and quaternary salts thereof; the pyridines include 2-vinyl pyridine, 3-vinyl pyridine, N-vinyl pyridine, and tertiary and quaternary salts thereof; the vinylbenzyl quaternary ammonium salts include vinylbenzyl tri-$C_{1-4}$ alkyl ammonium salts such as those disclosed in the specification of British Pat. No. 862,719; and the allylamines include (meth)allylamines (denoting allylamine and methallylamine collectively; which expression will be similarly used hereinafter in the specification) and mono- and di-$C_{1-4}$ alkyl substitution products thereof, di(meth)allylamines and alkyl substitution products thereof, and quaternized products of these alkyl-substituted (meth)allylamine.

Other ethylenically unsaturated monomer-optionally copolymerized with the aforementioned cationic monomer are nonionic monomers such as (meth)acrylamides, N-mono and N,N-di-$C_{1-14}$ alkyl (meth)acrylamides, (meth) acrylonitriles, $C_{1-4}$ alkyl (meth) acrylates, styrene, vinyl esters (such as vinyl acetate), vinyl ethers (such as vinylmethyl ether), and vinyl halides (such as vinyl chloride) and anionic monomers such as unsaturated carboxylic acids [such as (meth)acrylic acids and maleic acid], unsaturated sulfonic acids [such as aliphatic sulfonic acids including vinyl sulfonic acid and (meth)allyl sulfonic acids, aromatic vinyl sulfonic acids including vinyl toluene sulfonic acid and styrene sulfonic acid, sulfo(meth)acrylates including sulfo $C_{2-4}$ alkyl (meth)acrylates, and 2-hydroxy-3-(meth) acryloxypropane sulfonic acids, and sulfo(meth)acrylamides including (meth)acrylamide $C_{2-4}$ alkane sulfonic acid and 3-(meth)acrylamide-2-hydroxypropane sulfonic acid and salts thereof, such as alkali metal (Na, K, etc.) salts, ammonium salts, and amine salts including mono-, di-, and tri-ethanolamines and alkyl ($C_{1-4}$) amines. The proportion of the cationic monomer is generally at least 5%, desirably at least 10%, and particularly desirably at least 30%, based on the weight of all the monomers involved. The proportion of the (meth)acrylamide is generally in the range of 0 to 95%, preferably in the range of 0 to 70%. The proportion of the anionic and hydrophobic monomer is generally not more than 20%, preferably not more than 10%. The polymer and the copolymer of the cationic monomer optionally with some other monomer are found among those disclosed in the U.S. Pat. Nos. 4,152,307 and 3,259,570.

Other examples of the cationic high molecular weight destabilizers are cationically modified polyacrylamides, chitosan, polyethyleneimines, and epihalohydrin-amine condensates and cationized starches. Specific examples of cationically modified polyacrylamides are Mannich modification products (such as disclosed in the specification of U.S. Pat. No. 2,328,901) and Hofmann modification products of polyacrylamides. Examples of the polyethyleneimine are polyethyleneimines of polymerization degrees of 400 or more, preferably 2,000 or more, N-methyl substitution products thereof, and tertiary and quaternary salts of these (such as those disclosed in the specification of U.S. Pat. No. 3,259,570). Specific examples of the epihalohydrin-amine condensates are polycondensates of epichlohydrin with an alkylenediamine of two to six carbon atoms. Specific examples of the cationized starches are cationic starches, disclosed in the Encyclopedia of Chemical Technology (2nd edition), Vol. 18, pp 688–689. Specific examples of the chitosan are products obtained by heating chitins derived from shellfish such as squid, shrimp, etc.

The inorganic or organic cationic material is typically added to the wastewater stream after the stream is collected in a holding or treating tank. An effective amount of the cationic polymer, typically up to about 1500 parts per million based on the total accumulated effluent, is added to the effluent to participate in coagulation, destabilization or removal of the emulsified hydrophobic soils. Preferably the cationic material is added at a concentration of about 100 ppm to 1000 ppm, preferably from about 200 ppm to 800 ppm, based on the total collected effluent.

The Amphoteric Dicarboxylate

The amphoteric dicarboxylate is a compound having the following formula:

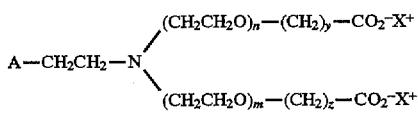

wherein A is R, or

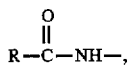

R is $C_{6-17}$ alkyl, y and z are independently selected from the group consisting of 1–6 and m and n are independently selected from the group consisting of 0–6, m+n≧1. The $X^+$ substituent represents a proton, an alkali metal cation or a portion of an alkaline earth metal cation. Preferred materials for use in this invention are the amphoteric dicarboxylate materials, disodium cocoamphodiacetate, disodium cocoamphodipropionate, disodium cocoaminodipropionate or mixtures thereof. These materials are available from Mona Industries, Inc., Patterson, N.J. and Rhone-Poulenc, Inc.

The above disclosed amphoteric dicarboxylate surfactant material can be separately added to the aqueous stream at any point during its creation or treatment. The amphoteric dicarboxylate can be added in a single portion, can be divided into several portions separately added or can be continuously metered into the aqueous stream. Typically the amphoteric material is added prior to the addition of a cationic destabilizer or flocculent and prior to any pH change or separation initiation. One preferred mode of utilizing the amphoteric dicarboxylate material in separating hydrophobic soils from an aqueous stream involves using a detergent composition formulated with the amphoteric dicarboxylate material. Such aqueous detergents can be used in a variety of cleaning protocols including laundry, floor cleaning, equipment cleaning, etc. The detergent composition contains a fully formulated built system using the amphoteric dicarboxylate as a component of the detergent. The detergent composition can contain a variety of other ingredients including both organic and inorganic functional materials, builders, etc.

Nonionic surfactant materials that can be used in the laundry compositions of the invention comprise either a $C_{8-18}$ alcohol ethoxylate that corresponds to the following formula:

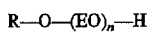

wherein the alcohol ethoxylate has 3–15 moles of ethylene oxide, or a $C_{8-9}$ alkyl phenol ethoxylate corresponding to the following formula:

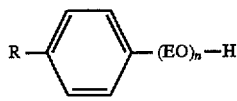

wherein the alkyl group can be straight or branched chain or can be substituted by common substituent and the ethoxylate compound can contain 3 to 15 moles of ethylene oxide, preferably 3 to 12 moles of ethylene oxide, most preferably 4 to 9.5 moles of ethylene oxide.

When the separation technology of the invention is used in a laundry composition, it can be combined with an alkaline source. As utilized herein, the term "alkaline source" refers to those alkaline compounds which are known to be useful as builders in detergent compositions for improving soil removal performance. Typical sources of alkalinity include the sodium and potassium hydroxides and the sodium and potassium silicates. Sodium carbonate is also a typical source of alkalinity in detergent compositions. Such sources of alkalinity are commonly available in either aqueous or powdered form which are both generally useable in formulating typical detergent compositions.

A second detergent component useful in a detergent composition is a surfactant. Surfactants are those organic compounds which include both a hydrophilic and a hydrophobic moiety on the same molecule and therefore are able to assist in the performance of a detergent composition by enhancing wetting of the substrate, suspending removed contaminants, and various other functions. A wide selection of anionic and nonionic surfactants providing various combinations of characteristics are commercially available from a number of sources. For a detailed discussion of surfactants see Kirk-Othmer, *Encyclopedia of Chemical Technology;* Second Edition, volume 19, pages 507–592.

A third detergent component useful in a detergent composition is a chelating/sequestering agent. Generally, chelating agents are those molecules capable of coordinating the metal ions commonly found in natural water and thereby preventing the metal ions from interfering with the functioning of the other detersive component(s) of the composition. Useful chelating agents include aminocarboxylic acids, condensed phosphates and polyacrylates.

Suitable aminocarboxylic acids include specifically, but not exclusively, N-hydroxyethyliminodiacetic acid, nitrilotriacetic acid (NTA), ethylenediaminetetraacetic acid (EDTA), N-hydroxyethyl-ethylenediaminetriacetic acid (HEDTA), and diethylenetriaminepentaacetic acid (DTPA).

Suitable condensed phosphates include specifically, but not exclusively phosphates such as sodium and potassium orthophosphate, sodium and potassium pyrophosphate, sodium tripolyphosphate, and sodium hexametaphosphate.

Suitable polyacrylates include specifically, but not exclusively, polyacrylic acid, polymethacrylic acid, acrylic acid-methacrylic acid copolymers hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a detailed discussion of chelating agents/sequestrants, see Kirk-Othmer, *Encyclopedia of Chemical Technology*, Second Edition, volume 6, pages 1–24.

Many colored materials contain a conjugated chain (a chain of alternating single and double bonds) with a terminal atom or group of atoms which can resonate between two different covalent states. The color of such materials may be destroyed by breaking one of the double bonds in the conjugated chain and/or chemically modifying the-terminal atom or atoms so as to prevent resonation. Hence, any chemical compound capable of chemically breaking a conjugated double bond and/or capable of modifying a resonating atom or group of atoms so as to interfere with resonation may be effective as a bleach.

Broadly, the five categories of bleaching materials include: (i) chlorine, (ii) hypochlorites and chloramines, (iii) hydrogen peroxide and other peroxy compounds, (iv) chlorite and chlorine dioxide, and (v) reducing agents. Generally, the preferred bleaching agent for use in laundry, warewashing and hard surface cleaners are those bleaches capable of liberating an active halogen species, under those conditions normally encountered in the cleansing processes. Based upon superior bleaching performance and ready availability, the preferred halogen releasing compounds typically include the alkali metal dichloroisocyanurates, chlorinated trisodiumphosphate, the alkali metal hypochlorites, monochloramine and dichloramine. Bleaching agents are generally deactivated when placed in an alkaline environment such as found within detergent compositions containing an alkaline source. Accordingly, additional steps may be required to maintain activity of a bleaching agent within a detergent composition. See, for example, U.S. Pat. Nos. 4,657,784 and 4,681,914. For a detailed discussion of bleaching agents, see Kirk-Othmer, *Encyclopedia of Chemical Technology*, Second Edition, volume 3, pages 550–566.

A fifth detergent component useful in a detergent composition is a defoamant. Typical defoamers are those compounds having a hydrophilic/hydrophobic balance suitable for reducing the stability of foam. The hydrophobicity is typically provided by an oleophilic moiety such as an aromatic alkyl or aralkyl group or an oxypropylene group or chain.

The hydrophilicity is typically provided by an oxyethylene group or chain or an ester group. The most frequently utilized defoamers include the phosphate esters and the nonionic organic surface-active polymers (surfactants) having both a hydrophobic groups or block and a hydrophilic ester-groups or block such as a nonylphenol ethoxylate. A discussion of defoaming nonionic surfactants may be found in U.S. Pat. Nos. 3,048,548 (Martin et al), 3,334,147 (Brunelle et al), and 3,444,242 (Rue et al).

A sixth detergent component useful in a detergent composition is an enzyme effective for catalyzing the break down of various contaminating compounds commonly found on the substrate(s) to be cleaned. Commonly employed enzymes include the proteinases which are capable of catalyzing the hydrolysis of proteinaceous materials, amylases which are capable of catalyzing the hydrolysis of polysaccharides, and lipases which are capable of catalyzing the hydrolysis of fats.

In addition to those components previously described, other conventional detergent components may be incorporated into the detergent composition so long as they do not meaningfully interfere with cleaning or pH initiated phase separation. Such components may include such compounds as bactericides, brightening agents, antiredeposition agents, inorganic salts, dyes and fragrances.

The formulated detergent composition of the invention can correspond with the following proportions set forth in Table I.

TABLE I

| Powder | Useful | Preferred | Most Preferred |
|---|---|---|---|
| Source of Alkalinity | 5–95 | 60–95 | 65–90 |
| Amphoteric carboxylate | 1–20 | 2–15 | 2–10 |
| Nonionic | 1–25 | 2–20 | 4–15 |
| Sequestrant | 0–40 | 0–20 | 2–12 |
| Liquid | Useful | Preferred | Preferred |
| Source of Alkalinity | 5–20 | 0–10 | 0–5 |
| Amphoteric carboxylate | 2–40 | 10–35 | 25–30 |
| Nonionic | 40–98 | 50–90 | 60–75 |
| Sequestrant | 0–20 | 4–15 | 4–10 |

The laundry compositions of the invention can comprise a number of product formats. The materials can be manufactured as liquid concentrates, particulate solids, pellets, or cast solid materials contained in either a solid plastic container or wrapped in water soluble or insoluble film.

We have found that the hydrophobic soil separation technology of this invention, operates through a cooperative action between the amphoteric dicarboxylate surfactant and the flocculent (or cationic destabilizer) at low pH to separate the hydrophobic soil from the aqueous stream. The preferred mode of addition of the materials in a laundry effluent separation process involves a first use of a fully formulated laundry detergent material containing the amphoteric dicarboxylate material. The laundry fabric is cleaned of hydrophobic soil using the fully formulated laundry detergent. The hydrophobic soil containing aqueous effluent passes from the laundry machine into a disposal system. The stream can be processed continually or can be processed semicontinuously or in a batch-wise mode. Since the aqueous laundry effluent contains the amphoteric dicarboxylate surfactant resulting from the laundry protocol, the stream is first acidified to a pH less than 7 using a sufficient amount of an acidic material to result in the desired pH. Typically, strong organic and inorganic acids can be added. Such acids include hydrochloric acid, nitric acid, phosphoric acid, sulfuric acid, acetic acid, trichloroacetic acid and others. Once the pH of the aqueous stream is adjusted to a preferred acidic pH, the stream is contacted with a source of the flocculent or cationic destabilizer material. In the process, the aqueous stream is contacted with the flocculent for a sufficient period of time to result in a phase separation of the hydrophobic soil that is sufficiently complete to result in a residual concentration of hydrophobic soil that is acceptable for municipal sanitation operation procedures. In a continuous process, the chemicals are metered into the stream to result in an effective concentration of the acidulant and the flocculent. The piping and tanks of the continuous system are sized and configured to ensure appropriate mixing, and sufficient separation time to result in the desired effluent concentration. In a batch process, the effluent stream is directed into a holding tank wherein it is treated with acidulant followed by a flocculent material either in the same tank or in separate treatment tanks. The tanks are suitably agitated and after phase separation, either the aqueous material is taken off the bottom of the tank or the hydrophobic soil is skimmed from the top of the tank. The treated aqueous stream can be directed to the municipal sewer system.

An amount of the amphoteric dicarboxylate surfactant composition is added to the stream such that the concentration of the amphoteric material reaches an effective pH change separating concentration which is typically less than about 1000 ppm based on the total amount of effluent. Preferably, the surfactant material is used at a concentration of about 10–1000 ppm, most preferably about 10 to about 250 ppm.

Similarly, the composition having sufficient acidity to change the pH of the effluent from approximately neutral or mildly alkaline to a pH less than 7, preferably less than 6, most preferably in the range of from about 3 to about 5.5 is added to the effluent material typically by metering the acidic material into a line leading to the holding or treating tank or into the treating tank directly. The pH of the material in the holding tank or in the line can be monitored to ensure that the acid material is added in sufficient proportions to maintain an effective pH change.

An amount of the flocculent or the cationic destabilizer material is added to the aqueous stream either in a continuous or batch-wise processing mode such that the concentration of the flocculent causes a rapid and substantially complete separation of the hydrophobic soil from the aqueous stream. Typically, an effective amount of the flocculent comprises about 10 to 1250 ppm of the material based on the aqueous stream. Preferably, the flocculent material is added to the aqueous stream at a concentration of about 10 to 1000 ppm, most preferably about 10 to 500 ppm for reasons of economy and rapid aqueous stream processing.

In the practice of the laundry chemical aspect of the invention, the soiled items are laundered in a conventional laundry machine in which the soiled item is contacted with an aqueous cleaning composition containing the ingredients disclosed at use levels of about 0.5 to 10 lbs. of composition per each 100 lbs. of fabric, rag, towel or other soiled unit. Typical laundry cycles are used in laundering the soiled items. After laundering is complete, the effluent contaminated with the hydrophobic organic soils can be accumulated and treated. In the practice of the invention, the effluent is treated after leaving the machine or is accumulated in any convenient storage vessel having appropriate handling equipment for addition of the pH change chemical. Such pH change chemicals can comprise common acidic material In our work with the laundry detergent composition of the invention, we have found that the compositions of the invention display superior performance when its pH controlled separation properties are compared to other surfactant systems in terms of residual hydrophobic soil concentration and the pH of the phase break between the hydrophobic portion and the aqueous portion. The compositions of the invention, and the performance of the composition in cleaning and phase separation are exemplified in the following examples and tables. We believe the performance of the separation chemicals in the laundry systems set forth below shows that the chemicals will perform similarly in any generic aqueous waste stream containing hydrophobic soil. The following contains a best mode.

TABLE II

| RAW MATERIAL | COMPARATIVE PREP | | | | EXAMPLES I–V | | | | |
|---|---|---|---|---|---|---|---|---|---|
| | ECOLAB | COHEN | MALONEY | MCFARLAN | EX 1 | EX 2 | EX 3 | EX 4 | EX 5 |
| NPE 9.5 | 4.0% | | | | 4.0% | 4.0% | 4.0% | 4.0% | 4.0% |
| NPE 4.5 | 4.0% | | | 9.0% | 4.0% | 4.0% | 4.0% | 4.0% | 4.0% |
| EP/PO Capped Surfactant - Cohen[1] | | 4.0% | | | | | | | |
| EP/PO capped Surfactant - Cohen[2] | | 4.0% | | | | | | | |
| Amine Ethoxylate - Maloney[3] | | | 8.0% | | | | | | |
| Octyldipropionate - Cohen[4] | | 3.0% | | | | | | | |
| Cocoamphomonoacetate[5] | | | | | | | | | 4.0% |
| Capryloamphodipropionate[6] | | | | | | | | 4.0% | |
| Capryloamphopropionate - McFarlan[7] | | | | 2.0% | | | | | |
| Cocoamphodipropionate[8] | | | | | 8.0% | 4.0% | | | |
| Cocoamphodiacetate[9] | | | | | | | 4.0% | | |
| Soda Ash Lt. Dens | 23.2% | 23.2% | 23.2% | 23.2% | 19.2% | 23.2% | 23.2% | 23.2% | 23.2% |
| Soda Metasilicate | 63.0% | 63.0% | 63.0% | 63.0% | 63.0% | 63.0% | 63.0% | 63.0% | 63.0% |
| Amorphorous Silicate Form[10] | 1.8% | 1.8% | 1.8% | 1.8% | 1.8% | 1.8% | 1.8% | 1.8% | 1.8% |
| Salt (NaCl) | 4.0% | 1.0% | 4.0% | 1.0% | | | | | |
| TOTAL | 100.0% | 100.0% | 100.0% | 100.0% | 100.0% | 100.0% | 100.0% | 100.0% | 100.0% |

[1]F-EP-25
[2]LF-EP-61
[3]TOMAH E-T-5
[4]OPD-LF
[5]ULTRA
[6]811
[7]CyNa-50
[8]CEM
[9]CDX
[10]Sipernate

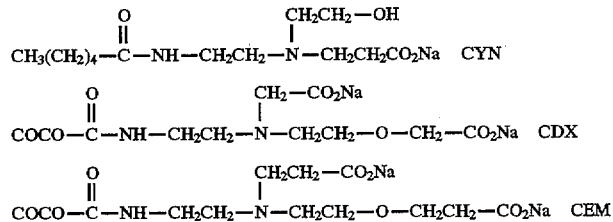

capable of changing the pH of the effluent from the pH typically between 8 and 12 to a pH less than 6. Suitable addition controls, agitators, and pH monitoring equipment are desirable. Further, the effluent container could be equipped with a site for removal of a sample for testing. The effluent can be tested for residual hydrophobic soil during phase separation. The effluent container should also be equipped with means to remove the treated effluent to a sewer discharge. Further, the container should be equipped with apparatus that can safely remove the demulsified soils to appropriate disposal.

The compositions set forth in Table II were evaluated for cleaning capacity and for performance in separating the hydrophobic soil from the aqueous effluent. The evaluations of cleaning performance were based on a powdered laundry detergent based on amphoteric carboxylate-containing surfactant chemistry. The formulas to be evaluated including comparative preparation and Examples 1–5 were evaluated using a common laundry procedure set forth in Table III.

TABLE III

Typical Wash Formula Using Alkaline Powder Composition

| OPERATION | TEMP (°F.) | TIME (min) | PRODUCT |
|---|---|---|---|
| FLUSH | HOT | 2 | |
| BREAK | 170 | 15 | 4 lbs. detergent/ 100 lbs. fabric |
| CARRYOVER | 170 | 5 | |
| RINSE | HOT | 2 | |
| DYE BATH | HOT 6 | | |
| 5 RINSES | HOT/COLD | 2 (Each) | |

The experimental results summarized in Table IV show the effectiveness of the detergents of the invention and the effectiveness of the separation technology. In Table IV under wash quality, a wick time test is used to demonstrate that the compositions of the invention can be very effective soil removing detergent compositions. In the data called water quality, the ability of the separation technology to result in low residual hydrophobic soil is demonstrated. In the wick time data a rapid time shows excellent cleaning properties. In the water quality data a low number indicates low residual hydrophobic soil content.

TABLE IV

| | WASH QUALITY | | | | | WATER QUALITY (COMPOSITE SAMPLE) | | | | | |
|---|---|---|---|---|---|---|---|---|---|---|---|
| | WICK TIME | | | | RAW | FOG AFTER 5 MIN[1] | | | NTU AFTER 5 MIN[2] | | |
| | 1 INCH | | 2 INCH | | WATER | pH | | | pH | | |
| | SECONDS | STD DEV | SECONDS | STD DEV | FOG | 4 | 6 | 8 | 4 | 6 | 8 |
| ECOLAB | 7.8 | 2.3 | 32.6 | 7.7 | 5800 | 5400 | 6500 | 5300 | 1280 | 1150 | 1260 |
| COHEN | 20.9 | 15.6 | 50.1 | 18.8 | 5800 | 2000 | 3000 | 3600 | 1280 | 1200 | 1260 |
| MALONEY | 47.9 | 15.8 | 101.5 | 27.3 | 3200 | 4400 | 4300 | 3900 | 1000 | 1100 | 1050 |
| MCFARLAN | 6.9 | 1.7 | 31.0 | 8.6 | 2100 | 420 | 340 | 1200 | 430 | 1140 | 1100 |
| EX 1 | 5.5 | 1.1 | 26.0 | 4.4 | 2500 | 290 | 2000 | 2000 | 48 | 500 | 520 |
| EX 1 (repeat) | | | | | 6100 | 240 | 1900 | 5000 | 70 | 365 | 500 |

[1]EPA 413.4
[2]EPA 180.1

Results

Polymer required (in ppm) to demulsify effluent such that effluent turbidity, measured by the procedure Turbidity method of Analysis, *Methods for Chemical Analysis of Water and Wastes*, EPA-600/4-79-020, March, 1983, is less than 10 NTUs at 60 sec. after the pH adjustment. Cationic A is a Quaternary Ammonium Polymer (CAS 42751-79-3), Cationic B is a Polyquaternary Amine (CAS 42751-79-1) and Cationic C is Aluminum Chlorohydrate (CAS 1327-47-9).

TABLE V

| | Polymer (ppm)[11] | | | | | | | | |
|---|---|---|---|---|---|---|---|---|---|
| pH Stand- | CATIONIC A | | | CATIONIC B | | | CATIONIC C | | |
| ard | 8 | 6 | 4 | 8 | 6 | 4 | 8 | 6 | 4 |
| NPE (9.5) | 800 | 600 | 600 | 1500 | 1500 | 650 | 2100 | 2100 | 900 |
| CEM2[12] | 600 | 400 | 100 | 1000 | 850 | 350 | 1500 | 1200 | 500 |
| CEM1[12] | 300 | 60 | 40 | 800 | 150 | 50 | 1100 | 175 | 100 |
| CDX[12] | 776 | 300 | 50 | 1600 | 700 | 125 | 2600 | 1100 | 200 |
| CYN[13] | 600 | 400 | 300 | 1300 | 700 | 500 | 1800 | 700 | 600 |

[11]Minimum concentration of cationic polymer needed to demulsify and separate hydrophobic soil
[12]Uses amphoteric dicarboxylate chemistry
[13]McFarlan patent chemistry The wick time test is a qualitative test used to predict cleaning properties in fabric cleaned with the test formula. In the wick time test, a red shop towel (approximately 12 inches×12 inches) is immersed in a tray or pan containing 1–2 inches of water. The towel is hung on a bar or line and immersed in the water, held in place using a bar or other weighting system. The time taken by the water to reach a one inch level or a two inch level is measured. The ability of the water to wet the fabric is characteristic of a high quality cleaning detergent used to clean the fabric. A fabric soiled by residual oil or fat will wick more slowly than a clean fabric. Accordingly, the rapidity with which the aqueous material wets and ascends the shop towel through the fabric mesh qualitatively characterizes the likely detergent properties of the detergent.

The data in the water quality portion of Table IV is obtained using EPA method 413.4 to obtain the fats, oils and grease content (FOG) after five minutes of separation time after the addition of the cationic or flocculent material. The data labeled NTU is obtained using EPA procedure 180.1 after five minutes of separation.

Inspecting the data set forth in Tables IV and V, the performance of all compositions of the invention substantially improved over the comparative preparations of the standard commercial prior art material. In particular, the material identified as Example 1 containing a preferred amphoteric carboxylate has clearly superior performance.

The above discussion, examples and data provide a basis for understanding the disclosure. However, the invention can embody a variety of compositions. The invention accordingly is found in the claims hereinafter appended.

We claim:

1. An alkaline cleaning concentrate composition comprising:

(a) an effective detergent amount comprising 5 to 95 wt-% of a source of alkalinity;

(b) an effective detergent and pH phase separation amount of an amphoteric dicarboxylate surfactant of the formula:

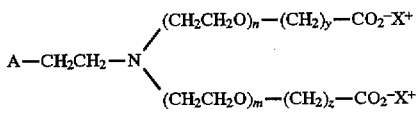

wherein A is

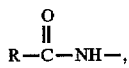

R is a $C_{9-17}$ alkyl, $X^+$ is ammonium or an alkali metal cation, y an z are independently 1–6 and m and n are independently 0–6, m+n≧1; and (c) an effective detergent amount comprising about 1 to 25 wt-% of a nonionic surfactant composition comprising a $C_{8-18}$ alcohol ethoxylate of the formula:

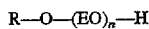

or a $C_{8-9}$ alkyl phenol ethoxylate surfactant of the formula:

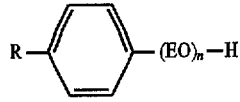

each having from 3–15 moles of ethylene oxide per mole of surfactant;
wherein fabric soiled with greasy or oily soils can be cleaned in an aqueous cleaning composition containing an effective cleaning amount of the concentrate resulting in an alkaline effluent containing substantial quantities of organic hydrophobic soil which can be readily separated from the aqueous effluent by contacting the effluent, at a pH less than 7, with an effective amount of a cationic emulsion destabilizing composition.

2. The composition of claim 1 wherein the source of alkalinity comprises an alkali metal carbonate.

3. The composition of claim 1 wherein the source of alkalinity comprises an alkali metal hydroxide.

4. The composition of claim 1 wherein the source of alkalinity comprises a water soluble alkali metal silicate.

5. The composition of claim 3 wherein the alkali metal hydroxide comprises a sodium hydroxide.

6. The composition of claim 1 which additionally comprises a sequestrant.

7. The composition of claim 6 wherein the sequestrant comprises sodium tripolyphosphate, sodium pyrophosphate or mixtures thereof.

8. The composition of claim 6 wherein the organic sequestrant comprises ethylene diamine tetraacetic acid or its sodium salt, nitrilotriaacetic acid or its sodium salt, polyacrylic acid or an acrylic acid copolymer or its sodium salt, or mixtures thereof.

9. The composition of claim 1 wherein the amphoteric surfactant has the following structure:

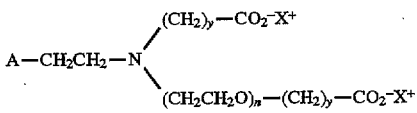

wherein A is

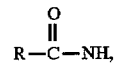

R is a $C_{9-17}$ alkyl, y is 1–6, n is 1–6 and $X^+$ is an alkali metal or ammonium cation.

10. The composition of claim 1 wherein the source of alkalinity comprises a mixture of 5–60 wt-% of sodium carbonate and 10–70 wt-% of sodium metasilicate.

11. The composition of claim 1 wherein the source of alkalinity comprises a mixture of 5–60 wt-% sodium carbonate, 20–35 wt-% of sodium hydroxide and 10–70 wt-% of sodium metasilicate, each based on the weight of the total composition.

12. A method of cleaning fabric, containing a substantial quantity of oily or greasy soil, with a composition that can be used to separate the soil from a contaminated aqueous effluent resulting from cleaning, the method comprising:

(i) contacting soiled fabric with an aqueous cleaning composition comprising a major proportion of water; and (a) an effective detergent amount comprising 5 to 95 wt-% of a source of alkalinity;

(b) an effective detergent and pH phase separation amount of an amphoteric dicarboxylate surfactant of the formula:

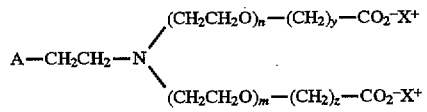

wherein A is

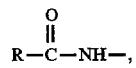

R is a $C_{9-17}$ alkyl, $X^+$ is ammonium or an alkali metal cation, y an z are independently 1–6 and m and n are independently 0–6, m+n≧1; and (c) an effective detergent amount comprising about 1 to 25 wt-% of a nonionic surfactant composition comprising a $C_{8-18}$ alcohol ethoxylate of the formula:

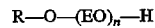

or a $C_{8-9}$ alkyl phenol ethoxylate surfactant of the formula:

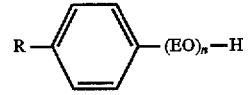

each having from 3–15 moles of ethylene oxide per mole of surfactant, resulting in an alkaline effluent containing substantial quantities of organic hydrophobic soil;

(ii) adjusting the pH of the effluent to less than 7 to produce an acidic effluent and contacting the acidic effluent with a cationic emulsion destabilizer to produce an organic phase comprising fats, oils and greases and an aqueous phase; and (iii) separating the organic phase from the aqueous phase.

13. The composition of claim 12 wherein the source of alkalinity comprises an alkali metal carbonate.

14. The composition of claim 12 wherein the source of alkalinity comprises an alkali metal hydroxide.

15. The composition of claim 12 wherein the source of alkalinity comprises an alkali metal silicate.

16. The composition of claim 15 wherein the alkali metal silicate comprises a water soluble sodium metasilicate or a sodium silicate.

17. The composition of claim 14 wherein the alkali metal hydroxide comprises a sodium hydroxide.

18. The composition of claim 12 which additionally comprises a sequestrant.

19. The composition of claim 18 wherein the sequestrant comprises sodium tripolyphosphate, sodium pyrophosphate or mixtures thereof.

20. The composition of claim 18 wherein the sequestrant comprises ethylene diamine tetraacetic acid or its sodium salt, nitrilotriaacetic acid or its sodium salt, polyacrylic acid or its sodium salt, or mixtures thereof.

21. The composition of claim 12 wherein the nonionic surfactant comprises a $C_{8-18}$ alcohol ethoxylate having 3-15 moles of ethylene oxide.

22. The composition of claim 12 wherein the amphoteric surfactant has the following structure:

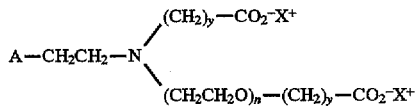

wherein A is

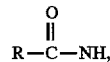

R is a $C_{9-17}$ alkyl, y is 1-6, n is 1-6 and $X^+$ is an alkali metal or ammonium cation.

23. The composition of claim 12 wherein the source of alkalinity comprises a mixture of 5-60 wt-% of sodium carbonate and 10-70 wt-% of sodium metasilicate.

24. The composition of claim 12 wherein the source of alkalinity comprises a mixture of 5-60 wt-% sodium carbonate, 20-35 wt-% of sodium hydroxide and 10-70 wt-% of sodium metasilicate, each based on the weight of the total composition.

25. The method of claim 12 wherein the concentrations of the fats, oils and greases in the aqueous phase after separation is less than 100 parts per million.

26. A liquid cleaning concentrate composition comprising:

(a) about 0-20 wt-% of a source of alkalinity;

(b) about 2-40 wt-% of an amphoteric dicarboxylate surfactant of the formula:

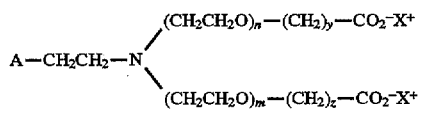

wherein A is

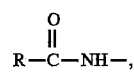

R is a $C_{9-17}$ alkyl, $X^+$ is ammonium or an alkali metal cation, y an z are independently 1-6 and m and n are independently 0-6, m+n≧1; and (c) about 40-98 wt-% of a nonionic surfactant composition comprising a $C_{8-18}$ alcohol ethoxylate of the formula:

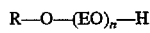

or a $C_{8-9}$ alkyl phenol ethoxylate surfactant of the formula:

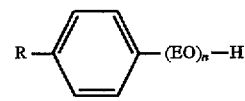

each having from 3-15 moles of ethylene oxide per mole of surfactant, or mixtures thereof;

wherein fabric soiled with greasy or oily soils can be cleaned in an aqueous cleaning composition containing an effective cleaning amount of the concentrate resulting in an alkaline effluent containing substantial quantities of organic hydrophobic soil which can be readily separated from the aqueous effluent by contacting the effluent, at a pH less than 7, with an effective amount of a cationic emulsion destabilizing composition.

27. The composition of claim 26 wherein the source of alkalinity is selected from the group consisting of an alkali metal carbonate, an alkali metal hydroxide and a water soluble alkali metal silicate and mixtures thereof.

28. The composition of claim 26 which additionally comprises a sequestrant.

29. The composition of claim 28 wherein the sequestrant comprises sodium tripolyphosphate, sodium pyrophosphate or mixtures thereof.

30. The composition of claim 28 wherein the organic sequestrant comprises ethylene diamine tetraacetic acid or its sodium salt, nitrilotriaacetic acid or its sodium salt, polyacrylic acid or an acrylic acid copolymer or its sodium salt, or mixtures thereof.

31. A method of cleaning fabric, containing a substantial quantity of oily or greasy soil, with a composition that can be used to separate the soil from a contaminated aqueous effluent resulting from cleaning, the method comprising:

(i) contacting soiled fabric with an aqueous cleaning composition comprising a major proportion of water; and a liquid cleaning concentrate according to claim 26;

(ii) adjusting the pH of the effluent to less than 7 to produce an acidic effluent and contacting the acidic effluent with a cationic emulsion destabilizer to produce an organic phase comprising fats, oils and greases and an aqueous phase; and (iii) separating the organic phase from the aqueous phase.

* * * * *